United States Patent [19]
Harris

[11] 3,824,501
[45] July 16, 1974

[54] AUTOMATIC CABLE EQUALIZER

[75] Inventor: Cliff Andrew Harris, Matawan, N.J.

[73] Assignee: Bell Telephone Laboratories, Incorporated, Murray Hill, Berkeley Heights, N.Y.

[22] Filed: July 12, 1973

[21] Appl. No.: 378,578

[52] U.S. Cl. .................... 333/18, 325/42, 328/150, 328/167, 330/107

[51] Int. Cl. .................... H04b 3/04

[58] Field of Search ............ 333/18, 28 R, 107, 109; 325/42, 65; 328/167

[56] References Cited

UNITED STATES PATENTS

| | | | |
|---|---|---|---|
| 3,528,040 | 9/1970 | Galvin | 333/18 |
| 3,568,100 | 3/1971 | Tarbox | 333/18 |
| 3,578,914 | 5/1971 | Simonelli | 333/18 X |
| 3,671,886 | 6/1972 | Fudemoto et al. | 333/18 |

*Primary Examiner*—Paul L. Gensler
*Attorney, Agent, or Firm*—G. E. Murphy

[57] ABSTRACT

Disclosed is an active data transmission cable equalizer which minimizes regeneration errors by maximizing the "eye opening" of signals emanating out of digital signal transmission cables. Equalization is achieved by monitoring the equalizer's peak output signal, by adjusting the gain $k$, of the equalizer, to maintain a constant output signal level, and by altering the frequency of a simple real zero, $g$, in the equalizer's transfer response in accordance with the relation $1/k = K_1g + K_2$, where $K_1$ and $K_2$ are equalizer constants.

10 Claims, 8 Drawing Figures

AUTOMATIC CABLE EQUALIZER

BACKGROUND OF THE INVENTION

This invention relates to data transmission cable equalizers and, more particularly, to apparatus for automatic equalization of data transmission cables wherein appropriate equalization is automatically achieved independent of cable length, gauge, or temperature.

An imperfect digital transmission medium introduces noise and various signal delays which cause intersymbol interferences that impede signal regeneration. One measure of quality which characterizes a transmission medium is the size of the "eye opening" of a signal's "eye diagram" on the receiving end. The "eye opening" defines a region, the decision region, within each clock period, that is best suited for performing the signal regeneration task. A more thorough treatment of the "eye diagram" subject is found in the book entitled *Data Transmission*, by W. R. Bennett and J. R. Davey. p.119, McGraw-Hill, 1965.

Presently, in order to provide for the necessary equalization of cables carrying digital signals fixed cable equalizers are used. These equalizers are selected based on frequency response and "eye opening" measurements performed on the particular cable to be equalized. Such selection of the fixed equalizers depends on cable length, repeater spacing, and on the average temperature of the cable. However, since fixed cable equalizers are selected from a finite set of networks, and since cable characteristics are measurably affected by temperature variations (particularly when a cable is pole mounted), equalization of cables by fixed equalizers has distinct drawbacks.

R. A. Tarbox, in a letter published in the *Proceedings of the IEEE*, March 1969, p. 363, describes a method for automatic equalization of a data transmission cable based on signal characteristics at the output of the cable equalizer. More specifically, Tarbox has found that a satisfactory "eye opening," as required for error free signal regeneration, can be achieved, for a range of temperatures and cables by detecting the peak signal level at the output of the equalizer and by responsively varying the gain, i.e., amplitude response, of the equalizer and the frequency location of a simple real zero of the equalizer's frequency response. The Tarbox equalizer varies gain and zero location in accordance with a complex nonlinear relationship which is a function of the detected peak voltage level. This causes the equalizer to possess an insufficient range of automatic equalization, requiring additional fixed equalization networks to be inserted for short cable lengths.

It is an object of this invention therefore, to obtain an improved automatic equalizer having a broader equalization range.

It is another object of this invention to realize an equalizer having a fixed simple relationship between the adjustable gain and the adjustable simple real zero of the equalizer's signal response based on the common characteristics of a family of cables.

SUMMARY OF THE INVENTION

These and other objects of this invention are achieved by a cable equalizer which includes four active elements arranged in a circuit configuration known as the "biquad." The biquad possesses the desired equalizer frequency response, which includes gain, fixed shaping (a pair of complex poles), and a simple real zero. In addition to the biquad, the equalizer includes apparatus for affecting the gain of the biquad and the frequency location of the real zero in the biquad's frequency response in accordance with the principles of this invention. More specifically, optimization of cable response to digital signals is achieved by detecting the peak signal at the equalizer's output, and by varying the value of a first resistor in the biquad, in response to the detected signal, to alter the gain, $k$, of the biquad, and, simultaneously, the frequency of the real zero, $g$, of the biquad is changed by varying a second resistor in the biquad so as to maintain a constant peak signal at the equalizer's output. The gain, $k$, and real zero, $g$, are related by $1/k = K_1g+K_2$, where $K_1$ and $K_2$ are preselected constants.

BRIEF DESCRIPTION OF THE DRAWING

The various advantages and features of the present invention will be more readily apparent from the following detailed description, taken in conjunction with the drawings, in which.

DETAILED DESCRIPTION

Figure 1:
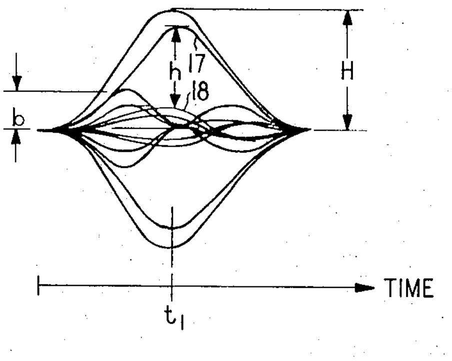
FIG. 1 illustrates a classic "eye diagram" of digital signals emanating out of equalized data transmission cables.

FIG. 1 illustrates the classic "eye diagram" characteristics of signals emanating out of data transmission cables transmitting bipolar coded signals. An "eye diagram" as shown in FIG. 1 is commonly generated, when testing data transmission cables, by superimposing a multiplicity of traces of digital signals on an oscilloscope display tube. In this manner all possible signal waveforms are displayed within one data transmission clock period. A careful examination of FIG. 1 indicates that the instant of time most suitable for detecting, reclocking, and regenerating of the digital signals is $t_1$, at which time the difference between the level of the lowest high signal 17 and the level of the highest low signal 18 is largest, i.e., the "eye opening" is largest. Accordingly, the size of the "eye opening," or the decision region, is defined at $t_1$, by the relation $h/H$ where $H$ is the maximum signal peak, and $h$ is the difference between minimum signal peak at $t_1$ and maximum signal interference at $t_1$, i.e., the difference between peak 17 and peak 18. However, in practice the height of the "overshooting" signal, $b$, is of importance since this overshoot can interfere with timing recovery circuitry. Thus, in practice, it is not only desirable to maximize $h/H$ but also to minimize $b/H$ to obtain a large decision region. Accordingly, the expression ($b/H$ 100, $h/H$ 100) where $h$, $b$, and $H$ are signal levels as indicated in FIG. 1 is taken, in this application, to represent the "eye opening."

Figure 2:
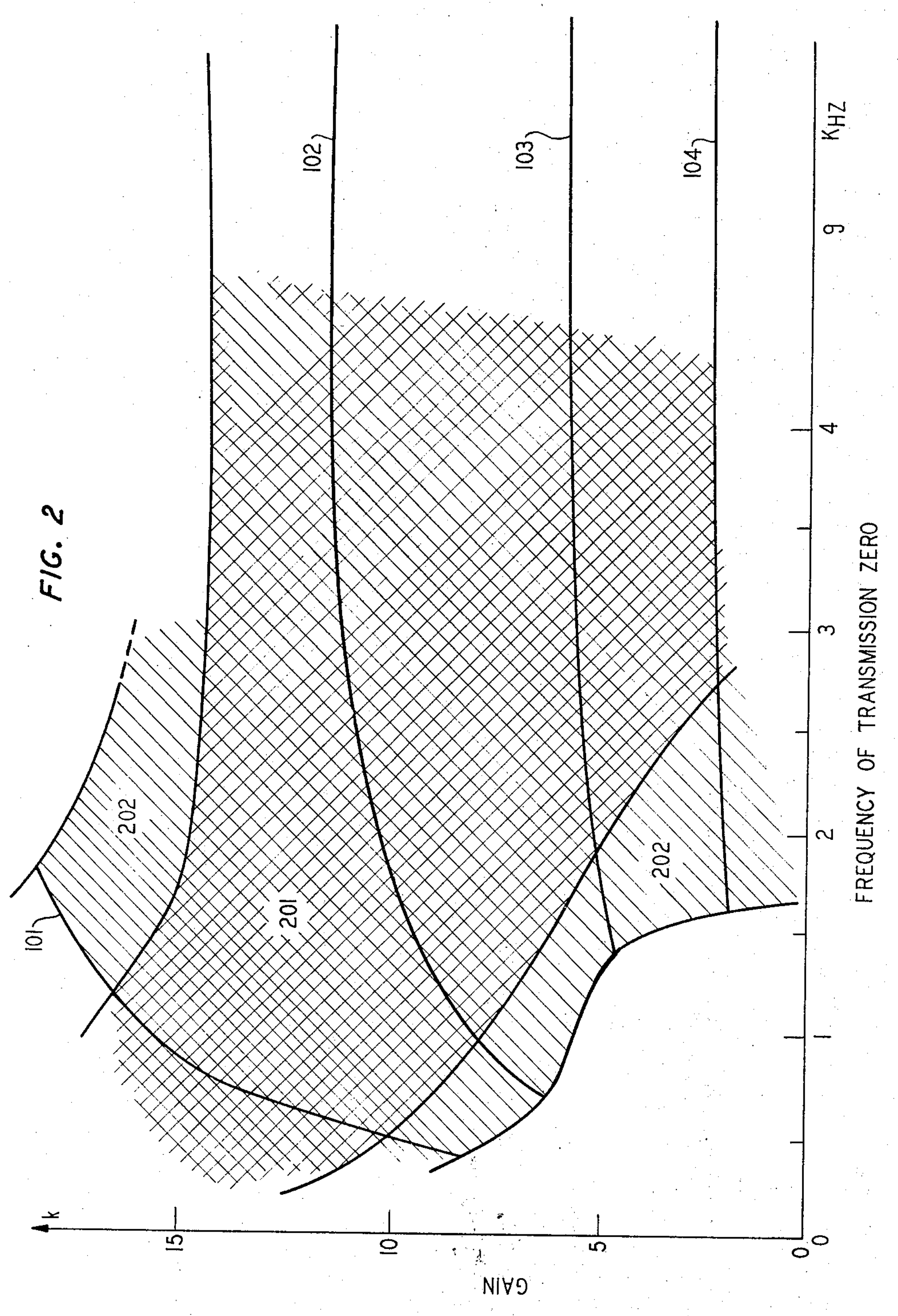
FIG. 2 depicts a plot of an equalizer's gain versus the frequency of the equalizer's zero, showing regions of acceptable "eye openings" for a 26 gauge cable.

Experimentally it has been found that by varying the gain $k$, of an equalizer, and by simultaneously altering the frequency location of a simple real zero, $g$, in the equalizer's frequency response, a satisfactory "eye opening" can be achieved while maintaining a constant peak output signal level for a wide range of temperatures, cable lengths, and cable gauges. FIG. 2 shows the "eye opening" response characteristics for specific fixed shaping of a 26 gauge cable, depicting areas of particular "eye openings" for various cable lengths, relative to the equalizer's zero frequency, $g$, and the equalizer's gain, $k$ varied independently for bipolar coded data transmitted at 2.4 kbits/sec. The family of curves 101, 102, 103, and 104 represent the response of cables having a length of 42,000 ft., 30,000 ft., 18,000 ft., and 6,000 ft., respectively. Shaded area 201 represents the region where the "eye opening" is at least (20,80), and shaded area 202 shows the region where the "eye opening" is at least (30,70). The peak equalized signal is maintained at a constant value in generating these characteristics.

Figure 3:
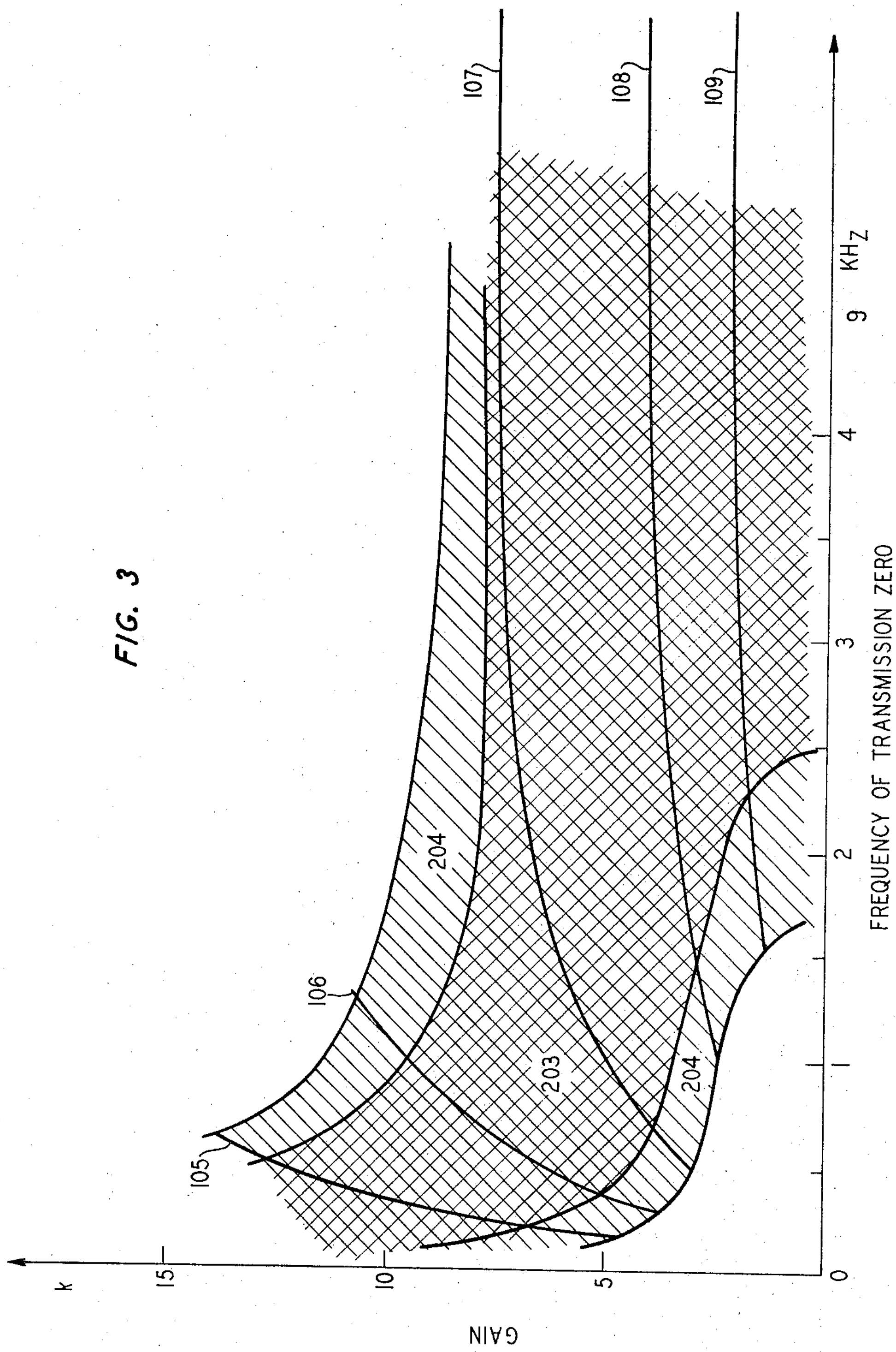
FIG. 3 depicts a plot of an equalizer's gain versus the frequency of the equalizer's zero, showing regions of acceptable "eye openings" for a 19 gauge cable.

FIG. 3 is similar to FIG. 2, showing a family of curves 105, 106, 107, 108, and 109 for a 19 gauge cable of lengths 120,000 ft., 96,000 ft., 74,000 ft., 48,000 ft., and 24,000 ft., respectively. Shaded area 203 represents the area wherein at least a (20,80) "eye opening" is attained, and shaded area 204 represents the area wherein at least a (30,70) "eye opening" is attained.

Figure 4:
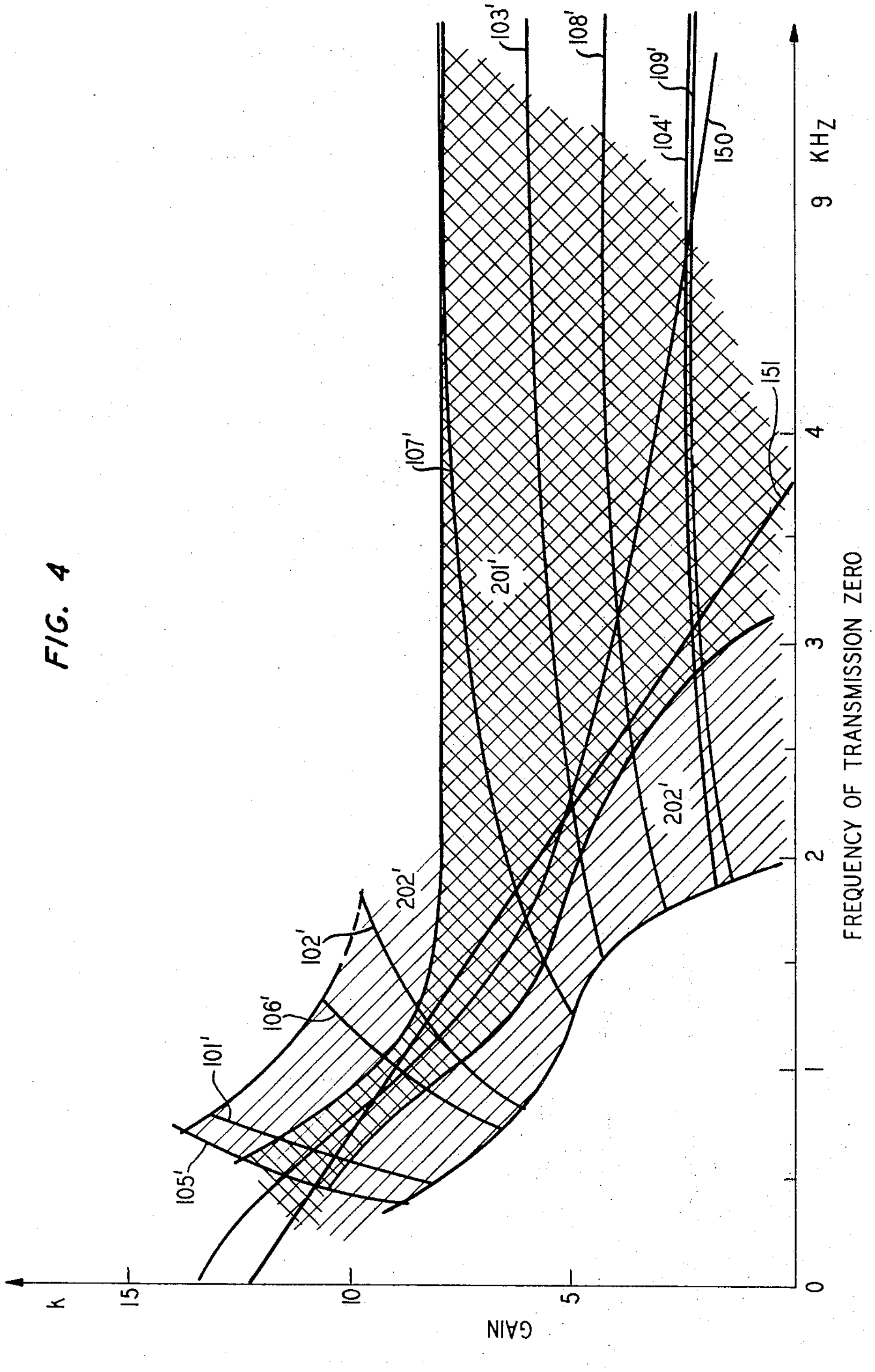
FIG. 4 shows a composite plot of an equalizer's gain versus the frequency of the equalizer's zero, showing the regions of acceptable "eye opening" common to all cable gauges between 26 gauge and 19 gauge, inclusive.

FIG. 4 shows the (20,80) "eye opening" region 201', and the (30,70) "eye opening" region 202', that are common to the 26 gauge and the 19 gauge cables, and, which in fact, are common to all cable gauges between 26 gauge and 19 gauge.

A close perusal of the common regions in FIG. 4 reveals that automatic equalization can be achieved for all cable lengths and gauges of interest, while maintaining a (20,80) "eye opening" by specific functional relationships between $k$ and $g$. It has been discovered that, in fact, numerous relations can exist between the gain of the equalizer, $k$, and the zero location of the equalizer, $g$, which are simple, which are easily implemented in integrated circuit technology and easily controlled via changes in certain circuit parameters, and which would guarantee a (20,80) "eye opening" for all cable lengths and gauges of interest. It has also been found that equalization can be achieved by circuit parameter variations in conformity with FIG. 1. Any $k$-$g$ relation representable by a linear function or by an inverse function which is contained within region 201' of FIG. 4, which intersects all cable lengths (curves 101', 102', 103', 104', 105', 106', 107', 108', 109'), and which also maintains a constant peak output signal level, would guarantee at least a (20,80) "eye opening" for all cable gauges of interest, and at all cable lengths of interest. Curve 150 in FIG. 4 is an example of such an inverse relation where $$1/k = K_1 g + K_2 \quad (1)$$

Curve 151 in FIG. 4 is a dual of curve 150 and is an equally good example of a valid $k$-$g$ relation where $$k = K_3 g + K_4 \quad (2)$$

$K_1$, $K_2$, $K_3$ and $K_4$ are, of course, appropriately valued equalizer constants.

Figure 5:
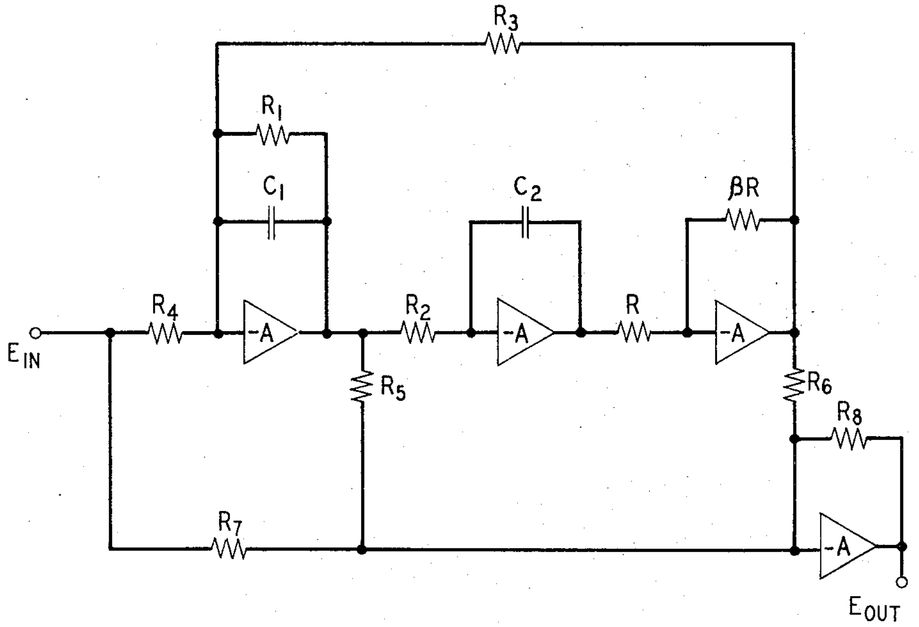
FIG. 5 (PRIOR ART)
FIG. 5 shows a prior art biquad active filter.

FIG. 5 depicts a prior art active filter configuration that may be utilized in the practice of this invention. It has biquadratic transfer function of the form:

$$(E_{out}/E_{in}) = (m\, s^2 + a_1 s + a_2/s^2 + d_1 s + d_2) \quad (3)$$

where $s$ is the complex frequency variable and $m$, $a_1$, $a_2$, $d_1$, and $d_2$ are preselected constants. A thorough treatment of this circuit, commonly known as the "biquad," can be found in the articles by Lee C. Thomas entitled "The Biquad : Part 1 — Some Practical Design Considerations," *IEEE Transactions on Circuit Theory*, Vol. CT—18, No. 3, May 1971, p. 350; "The Biquad : Part 2 — A Multipurpose Filtering System," *IEEE Transactions on Circuit Theory*, Vol. CT—18, No. 3, May 1971, p. 358.

Analysis of the biquad shown in FIG. 5 yields the transfer response $$(E_{out}/E_{in}) = -(R_8/R_7) + R_8R_1R_3(sC_2R_2R_6 + \beta R_5)/R_4R_5R_6\ [sC_2R_2R_3(sC_1R_1 + 1) + \beta R_1\ ] \quad (4)$$

If $R_7$ is made infinite (omitted from FIG. 5), equation (4) degenerates to $$(E_{out}/E_{in}) = R_8R_1R_3\ (sC_2R_2R_6 + \beta R_5)/R_4R_5R_6(s^2C_1C_2R_1R_2R_3 + sC_2R_2R_3 + \beta R_1) \quad 5$$

Equation (5) contains a gain term, a simple real zero at $$s = -\beta R_5/C_2R_2R_6 \quad (6)$$

and a pair of complex poles at the roots of $$s^2C_1C_2R_1R_2R_3 + sC_2R_2R_3 + \beta R_1 \quad (7)$$

Equation (5) may be rewritten as $$(E_{out}/E_{in}) = k\,[1 + (s/g)\,]\,[\,\beta/C_1C_2R_2R_3]/s^2 + s(1/C_1R_1) + \beta/C_1C_2R_2R_3 \quad (8)$$

where $$k = (R_8R_3/R_4R_6) \quad (9)$$

is the gain at dc, and $$g = \beta R_5/C_2R_2R_6 \quad (10)$$

is the frequency of the simple real zero.

Equation (8) clearly indicates that the modified biquad, with $R_7$ omitted, provides exactly the transfer function required for the equalizer; namely, gain, a simple real zero, and a pair of complex poles. Further, it appears from equations (8), (9), and (10) that $R_4$ or $R_8$ can be altered, affecting only the gain parameter, $k$, and that $R_5$ can be altered, affecting only the simple real zero parameter, $g$. Consequently, in accordance with the principles of this invention, the biquad circuit is used to implement the equalizer with $R_7$ omitted and with $R_4$ constructed as two resistors, $R_4'$ and $R_4''$. Further $R_4'$ is made proportional to $R_5$ by a constant of proportionality, $M$, to wit, $$R_5 = MR_4' \qquad (11)$$

From equation (9), therefore, it can be shown that $$(1/k) = (R_6/R_3R_8)\, R'_4 + (R_6/R_3R_8)\, R_4'' \qquad (12)$$

From equations (10) and (11)

$$g = M\beta R_4'/C_2R_2R_6 \qquad (13)$$

thus $$(1/k) = [\ C_2R_2R_6^2/M\beta R_3R_8]\ g + R_6R_4''/R_3R_8 \qquad (14)$$

or $$(1/k) = K_1g + K_2, \qquad (15)$$

which is the desirable relation between the gain, $k$, and the zero, $g$, as was expressed by equation (1). In addition, to fully meet the requirements of automatic cable equalization requiring a constant peak signal level at the equalizer's output, $R_4'$ is made directly responsive to the signal level at the output of the biquad, thereby establishing proper gain feedback.

Figure 7:
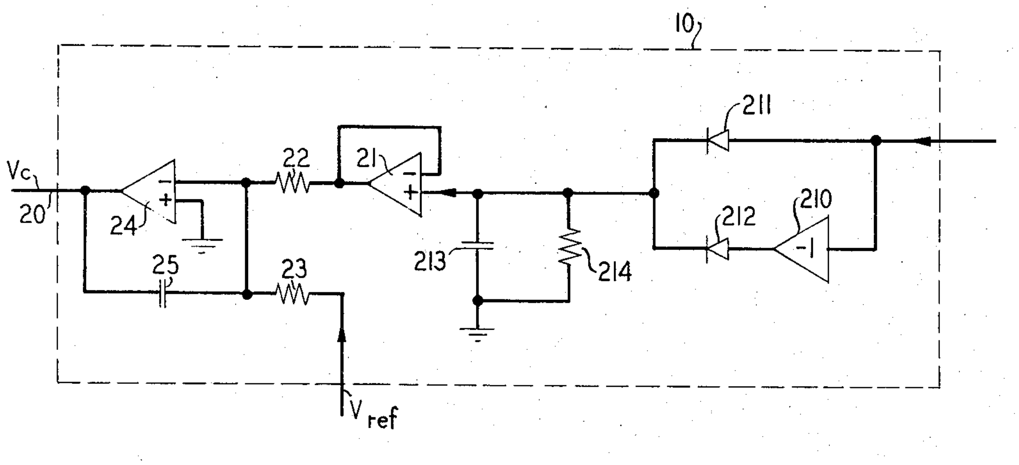
FIG. 7 is a detailed schematic diagram of the peak detector shown in FIG. 6.
Figure 6:
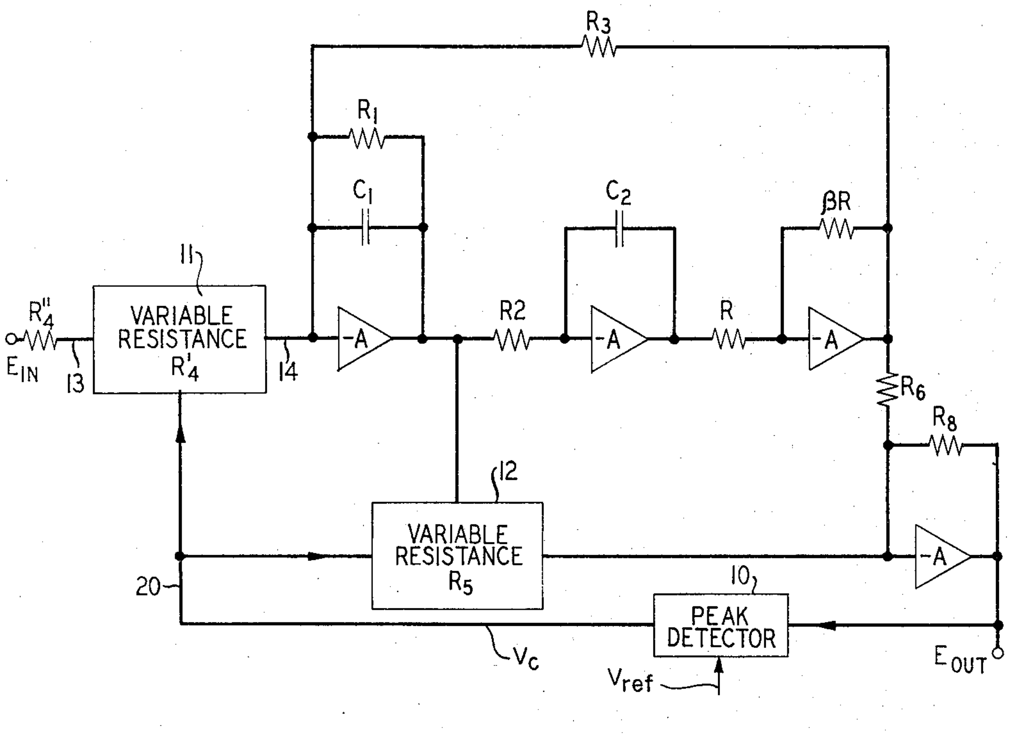
FIG. 6 shows an automatic cable equalizer using the principles of this invention.

FIG. 6 depicts the schematic diagram of a cable equalizer of this invention wherein the gain, $k$, is related to the zero, $g$, by relation (15). The equalizer shown in FIG. 6 comprises a biquad circuit with imbedded controlled variable resistors 11 and 12, and a peak signal detector 10 responsive to the output signal of the equalizer, which generates and compares the peak output signal to a reference voltage, $V_{ref}$, and generates a control signal, $V_c$. The control signal is applied to variable resistors 11 and 12 to affect the gain, $k$, and the transmission zero, $g$, in accordance with relation 15. One embodiment of detector 10 is shown in FIG. 7, wherein inverter amplifier 210 and diodes 211 and 212 transfer signal peaks to the holding capacitor 213 and the dissipating resistor 214. Thus, the signal level across capacitor 213 is proportional to the signal level peaks in the equalizer's output.

This signal across capacitor 213 is buffered by operational amplifier 21, compared to the desired peak signal level, $V_{ref}$, and integrated by operational amplifier 24 in combination with resistors 22, 23 and capacitor 25. The output signal of amplifier 24, on lead 20, is the control signal, $V_c$, which controls the value of gain, $k$, and of zero, $g$, via the control of variable resistors 11 and 12, respectively.

Variable resistors 11 and 12 can be constructed in a number of ways, as long as the following constraints are maintained:

1. $R_4'$ must generally increase with increased control voltage, $V_c$, to insure the proper negative feedback. It need not be linear with respect to $V_c$. Monotonicity of $R_4'$ to $V_c$ is desirable to assure controllability.
2. $R_4'$ and $R_5$ must be matched to a first degree of approximation in accordance with the above equations, and the biquad resistors and capacitors must, of course, be selected so that the resultant $k$-$g$ relation is subsumed by region 201' in FIG. 4. The proportionality constant M can equal 1.

Figure 8:
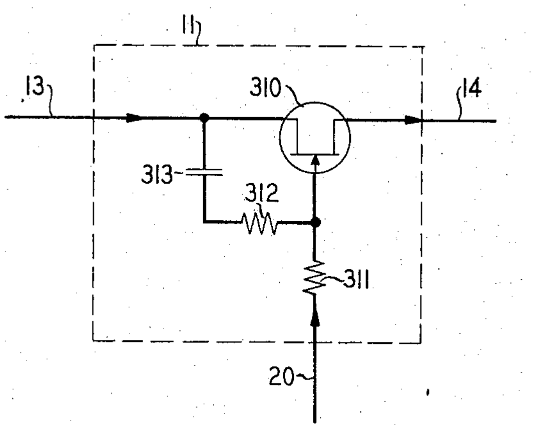
FIG. 8 is a detailed schematic diagram of a controlled variable resistor used in the apparatus of FIG. 6.

Accordingly, the controlled variable resistors $R_4'$ and $R_5$, which are elements 11 and 12 in FIG. 6, respectively, can be identical. One embodiment of such a variable resistor is shown in FIG. 8 wherein field effect transistor 310 serves as a voltage controlled variable resistor. Resistors 311 and 312 serve to linearize the resistance of the field effect transistor with respect to the control voltage, $V_c$, on lead 20, while capacitor 313 serves to isolate the control voltage, $V_c$, from the data signal path 13. A complete discussion of this circuit and its advantages is presented by H. P. von Ow in *Proceedings of the IEEE,* Vol. 10, October 1968, p. 1,718.

It is to be understood that the embodiment shown and described herein is illustrative of the principles of this invention and that modifications may be implemented by those skilled in the art without departing from the spirit and scope of this invention. For example, an equally good automatic equalizer circuit can be achieved using the dual relation defined by equation (2). This can be done, for example, by relating and appropriately altering $R_5$ and $R_8$ in the circuit shown in FIG. 6. That is, rather than $R_4$, $R_8$ can be constructed as two resistors, $R_8'$ and $R_8''$ with $R_8'$ made porportional to $R_5$ ($R_5 = MR_8'$) in a manner similar to that indicated by equations (11), (12), (13), and (14), thereby yielding the $k$-$g$ relation defined by equation (2).

I claim:

1. Apparatus for equalizing the pulse response of a data transmission cable comprising:

an active filter, responsive to said cable's output signal, exhibiting a transfer frequency response characterized by an adjustable gain factor and by a transmission zero in the frequency domain at an adjustable frequency;

detection means responsive to the output signal of said active filter for generating a control signal responsive to the peak signal level of said active filter's output signal;

means responsive to said control signal for adjusting said gain of said active filter to maintain a constant active filter peak output signal; and means responsive to said control signal for adjusting said frequency of said transmission zero of said active filter in accordance with a fixed linear relationship between said frequency and the inverse of said gain.

2. Apparatus for equalizing applied digital signals prior to regeneration of said digital signals comprising:

an equalizer responsive to said applied digital signals for optimizing the decision region for said regeneration of said applied digital signals, said equalizer exhibiting a frequency response comprising a factor $k(1+s/g)$, where $k$ is a controllable gain factor of said equalizer, $g$ is a controllable constant which specifies the zero frequency location, and $s$ is the complex frequency variable; and means responsive to said equalizer's output signal for adjustably increasing said zero frequency location specifying constant, $g$, and for adjustably decreasing said gain factor, $k$, with respect to an increasing peak signal level of said equalizer's output signal in accordance with a $k$-$g$ relationship that is subsumed by a preselected eye opening region common to a selected range of cable temperatures, cable lengths, and cable gauges.

3. The apparatus defined in claim 2 wherein said subsumed $k$-$g$ relationship is $1/k = K_1g + K_2$ where $K_1$ and $K_2$ are fixed constants.

4. The apparatus defined in claim 2 wherein said $k$-$g$ relationship subsuming a preselected common eye opening is $k = K_1g + K_2$ where $K_1$ and $K_2$ are fixed constants.

5. The apparatus defined in claim 2 wherein said means for adjusting the values of $k$ and $g$ further comprise:

means responsive to the peak voltage output signal of said equalizer for developing a control signal $V_c$;

means responsive to said control signal, $V_c$, for monotonically altering said frequency specifying constant, $g$, in response to an increasing control signal, $V_c$; and means responsive to said control signal, $V_c$ for varying said gain factor, $k$, in accordance with the relation $1/k = K_1g + K_2$ where $K_1$ and $K_2$ are predetermined constants.

6. Apparatus for improving the signal response of a cable including equalizer means, having an adjustable signal amplitude response factor and adjustable frequency response transmission zero factor, for processing said cable output signal, comprising:

means responsive to said equalizer output signal for detecting the peak signal value of said equalizer output signal;

means responsive to said detecting means output signal for varying the amplitude response factor of said equalizer in accordance with said detected peak output signal value to maintain a constant peak output signal value; and means responsive to said detecting means output signal for varying the frequency response transmission zero factor of said equalizer in accordance with said detected peak output signal value to maintain a linear relation between the inverse of said amplitude response factor and said frequency response factor.

7. Apparatus for improving the digital signal response of a cable including a biquadratic active filter, responsive to an output signal of said cable, said filter exhibiting a frequency response including a gain factor, $k$, and a transmission zero, $g$, in the frequency domain, and having a first resistor which controls solely the gain of said filter, in an inverse manner, and a second resistor which controls solely the frequency of said transmission zero of said filter, in a direct manner, wherein the improvement comprises:

means responsive to the peak signal value of said output signal of said filter for monotonically and jointly varying the values of said first and second resistors in response to said peak signal value.

8. The apparatus defined in claim 7 wherein said first resistor affecting said gain, $k$, and said second resistor affecting said transmission zero, $g$, are varied in accordance with the relation $1/k = K_1g + K_2$ where $K_1$ and $K_2$ are preselected constants.

9. Apparatus for equalizing the pulse response of a data transmission cable comprising:

an active filter, responsive to said cable's output signal, exhibiting a transfer frequency response characterized by an adjustable gain, $k$, factor and by a transmission zero factor, $g$, adjustable in the frequency domain;

detection means responsive to the output signal of said active filter for generating a control signal, $V_c$, responsive to the peak signal level of said active filter's output signal;

means responsive to said control signal for adjusting said gain, $k$, of said active filter to maintain a constant peak output signal of said active filter; and means responsive to said control signal for adjusting said zero, $g$, of said active filter in accordance with a fixed linear relationship proportional to said gain.

10. The apparatus defined in claim 9 wherein said means for adjusting the values of $k$ and $g$ further comprises:

means responsive to said control signal, $V_c$, for monotomically altering said frequency specifying constant, $g$, in response to an increasing control signal, $V_c$; and means responsive to said control signal, $V_c$, for varying said gain factor, $k$, in accordance with the relation $k = K_1g + K_2$ where $K_1$ and $K_2$ are predetermined constants.

* * * * *

UNITED STATES PATENT OFFICE
CERTIFICATE OF CORRECTION

Patent No. 3,824,501 Dated July 16, 1974

Inventor(s) Cliff A. Harris

It is certified that error appears in the above-identified patent and that said Letters Patent are hereby corrected as shown below:

The address of the Assignee should read --Murray Hill, Berkeley Heights, N. J. --.

Column 3, line 55, "FIG. 1" should read --FIG. 4--.

Column 4, equation 3 should read $$--(E_{out}/E_{in}) = (m\ s^2 + a_1 s + a_2)/(s^2 + d_1 s + d_2)--. \quad (3)$$

Column 4, line 37, the numeral 5 at the end of the equation should be aligned with and the same size as the numeral 4 on line 32 as this numeral is not part of the equation but is only intended to identify same.

Column 4, equation 8 should read $$--(E_{out}/E_{in} = k[1 + (s/g)]\ [\beta/C_1C_2R_2R_3]/ [s^2 + s(1/C_1R_1) + \beta/C_1C_2R_2R_3]-- \quad (8)$$

Signed and sealed this 29th day of October 1974.

(SEAL)
Attest:

McCOY M. GIBSON JR.
Attesting Officer

C. MARSHALL DANN
Commissioner of Patents

USCOMM-DC 60376-P69
☆ U.S. GOVERNMENT PRINTING OFFICE : 1969 O—366-334.